(12) United States Patent
Sim et al.

(10) Patent No.: US 10,093,823 B2
(45) Date of Patent: Oct. 9, 2018

(54) FLAME RETARDANT RESIN COMPOSITION

(71) Applicant: LG CHEM, LTD., Seoul (KR)

(72) Inventors: Jae Young Sim, Daejeon (KR); Ki Young Nam, Daejeon (KR); Yong Yeon Hwang, Daejeon (KR); Je Sun Yoo, Daejeon (KR); Seon Hyeong Bae, Daejeon (KR); Jae Yeon Bae, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/760,831

(22) PCT Filed: Oct. 14, 2014

(86) PCT No.: PCT/KR2014/009639
§ 371 (c)(1),
(2) Date: Jul. 14, 2015

(87) PCT Pub. No.: WO2015/056959
PCT Pub. Date: Apr. 23, 2015

(65) Prior Publication Data
US 2016/0230038 A1 Aug. 11, 2016

(30) Foreign Application Priority Data
Oct. 18, 2013 (KR) ........................ 10-2013-0124507

(51) Int. Cl.
| | | |
|---|---|---|
| C08K 5/00 | (2006.01) | |
| C08K 5/49 | (2006.01) | |
| C08L 25/08 | (2006.01) | |
| C08L 63/00 | (2006.01) | |
| C08L 67/00 | (2006.01) | |
| C08L 55/02 | (2006.01) | |
| C08L 67/02 | (2006.01) | |
| C09D 167/02 | (2006.01) | |
| H01B 7/17 | (2006.01) | |
| C08K 5/51 | (2006.01) | |
| C08K 5/52 | (2006.01) | |
| C08K 5/521 | (2006.01) | |
| C08K 5/523 | (2006.01) | |
| C08L 25/10 | (2006.01) | |
| C08L 25/12 | (2006.01) | |
| C08L 25/14 | (2006.01) | |
| C09D 125/08 | (2006.01) | |
| C09D 125/10 | (2006.01) | |
| C09D 125/12 | (2006.01) | |
| C09D 125/14 | (2006.01) | |
| C09D 155/02 | (2006.01) | |
| C08G 59/32 | (2006.01) | |

(52) U.S. Cl.
CPC ..... *C09D 167/025* (2013.01); *C08G 59/3218* (2013.01); *C08K 5/49* (2013.01); *C08K 5/51* (2013.01); *C08K 5/52* (2013.01); *C08K 5/521* (2013.01); *C08L 25/08* (2013.01); *C08L 25/10* (2013.01); *C08L 25/12* (2013.01); *C08L 25/14* (2013.01); *C08L 55/02* (2013.01); *C08L 63/00* (2013.01); *C08L 67/00* (2013.01); *C08L 67/025* (2013.01); *C09D 125/08* (2013.01); *C09D 125/10* (2013.01); *C09D 125/12* (2013.01); *C09D 125/14* (2013.01); *C09D 155/02* (2013.01); *H01B 7/17* (2013.01); *C08K 5/523* (2013.01)

(58) Field of Classification Search
CPC .......... C08G 63/66; C08F 12/08; C08F 12/10; C08L 55/02; C08L 67/025; C08L 25/08–25/14; C08L 63/00–63/10; C09D 155/02; C09D 167/025; C09D 125/08–125/14; C09D 163/00–163/10; H01B 7/17; C08K 5/49; C08K 5/51; C08K 5/52; C08K 5/521; C08K 5/523
See application file for complete search history.

(56) References Cited

U.S. PATENT DOCUMENTS

| | | | | |
|---|---|---|---|---|
| 4,500,679 A * | 2/1985 | DuFour | ................. | C08L 35/06 525/173 |
| 5,047,470 A * | 9/1991 | Whalen | ................. | C08L 55/02 525/166 |
| 7,217,763 B2 * | 5/2007 | Choi | .................... | C08F 279/02 525/69 |
| 2004/0127611 A1 * | 7/2004 | Yamanaka | ............. | C08K 5/49 524/116 |
| 2008/0167406 A1 | 7/2008 | Yamada | | |
| 2013/0327558 A1 * | 12/2013 | Karayianni | ........... | H01B 3/422 174/110 SR |

FOREIGN PATENT DOCUMENTS

| | | |
|---|---|---|
| EP | 1 935 944 A2 | 6/2008 |
| EP | 2 505 607 A1 | 10/2012 |
| JP | 2000-239543 A | 9/2000 |

(Continued)

OTHER PUBLICATIONS

Machine translation of KR 20090066379 A1.*

(Continued)

*Primary Examiner* — Kregg T Brooks

(57) ABSTRACT

The present invention relates to a flame retardant resin composition including (A) 100 parts by weight of a blend resin composition including a styrene copolymer and a polyester elastomer, (B) 1 to 30 parts by weight of an epoxy resin, and (C) 1 to 30 parts by weight of a phosphor-based flame retardant agent. The flame retardant resin composition has improved flame retardant properties and flexibility and is used for coating a wire and a cable.

19 Claims, No Drawings

(56) References Cited

FOREIGN PATENT DOCUMENTS

| JP | 2001-049096 A | 2/2001 |
|----|---------------|--------|
| JP | 2008-156392 A | 7/2008 |
| KR | 10-2003-0027299 A | 4/2003 |
| KR | 10-2009-0066379 A | 6/2009 |

OTHER PUBLICATIONS

Machine translation of KR 20030027299 A.*
Craig et al., "Equilibrium Structures for Butadiene and Ethylene: Compelling Evidence for π-Electron Delocalization in Butadiene," J. Phys. Chem. A 110, 7461-7469 (2006).*
Extended European Search Report for European Application No. 14854514.8 dated Jul. 7, 2016.
International search report for PCT/KR2014/009639 filed on Oct. 14, 2014.

* cited by examiner

FLAME RETARDANT RESIN COMPOSITION

TECHNICAL FIELD

The present invention relates to a flame retardant resin composition that may be used as a coating material of a wire or a cable, and more particularly, to a non-halogen flame retardant resin composition for coating a wire and a cable, having improved flame retardant properties and flexibility by including a blend resin composition of a styrene copolymer and a polyester elastomer, an epoxy resin contributing to the improvement of the flame retardant properties, and a phosphor-based flame retardant.

BACKGROUND ART

A wire or a cable used in electrical and electronic parts requires various properties including flame retardant properties, physical properties after thermal deterioration, properties at a low temperature, heat resistance, etc., particularly, flame retardant properties satisfying the high degree of retardancy grade (VW-1) based on UL-1581 with North American countries as the center.

In the present, an economical material including PVC or a halogen retardant agent, satisfying all the above-described conditions is generally used as a material for coating. However, for the PVC, toxic gases threatening a human body and natural environment, such as hydrochloride, dioxin may be generated in the event of fire or during performing an incinerating process after use. Thus, the regulation on the use of the PVC is under discussion with developed countries in Europe, America, Japan, etc., as the center. In addition, for other resins including the halogen flame retardant agent, since a hydrogen halide harmful to a human body and natural environment is generated, there are also restrictions on the use thereof.

Recently, as a non-halogen coating material of a wire, capable of improving the defects, a composition having a polyolefin-based resin as a base and including a metal hydroxide such as magnesium hydroxide and aluminum hydroxide has been suggested. However, since an excessive amount of the metal hydroxide is necessary to exhibit flame retardant properties, the deterioration of the physical properties of the composition including the lowering of the flexibility or the tensile strength of the wire may be generated. In addition, the metal hydroxide in a powder state and various additives including a flame retardant agent in a powder state may stick to each other, and the insertion thereof may become difficult.

As another method, a method of imparting flame retardant properties by using a polyphenylene oxide with an elastomer and a phosphor-based flame retardant agent has been suggested. However, polyphenylene oxide forms char to produce a solid blocking layer and the system thus produced blocks heat and oxygen, however the elastomer alone could not exhibit flame retardant properties.

Particularly, since the polyphenylene oxide does not have flexible properties, in the case that the amount of the polyphenylene oxide is increased to attain flame retardant properties; various physical properties required for a resin for coating a wire such as flexibility may be deteriorated.

Therefore, the development of a flexible and eco-friendly flame retardant resin composition is necessary to satisfy the flame retardancy grade on the basis of UL-1581.

DISCLOSURE OF THE INVENTION

Technical Problem

A flame retardant resin composition having good flexibility, flame retardant properties and other physical properties, and being used for coating a wire or a cable is provided in the present invention.

Technical Solution

According to an aspect of the present invention, there is provided a flame retardant resin composition including (A) 100 parts by weight of a blend resin composition including a styrene copolymer and a polyester elastomer, (B) 1 to 30 parts by weight of an epoxy resin, and (C) 1 to 30 parts by weight of a phosphor-based flame retardant agent.

In this case, the flame retardant resin composition is a non-halogen flame retardant resin composition and may be used as a coating material of a wire or a cable.

Advantageous Effects

The flame retardant resin composition according to the present invention may obtain the improving effect of flame retardant properties and flexibility at the same time by including a blend resin composition of a styrene copolymer and a polyester elastomer, preventable of dripping and capable of imparting flexibility, an epoxy resin capable of forming char and improving flame retardant properties and a phosphor-based flame retardant agent assisting the formation of the char.

BEST MODE FOR CARRYING OUT THE INVENTION

Hereinafter, the present invention will be described in more detail to assist the understanding of the present invention. It will be understood that terms or words used in the specification and claims, should not be interpreted as having a meaning that is defined in dictionaries, but should be interpreted as having a meaning that is consistent with their meaning in the context of the present invention on the basis of the principle that the concept of the terms may be appropriately defined by the inventors for the best explanation of the invention.

First, to solve the above-described defects of common technique, the formation of a flame retardant resin composition having improved flexibility and flame retardant properties was confirmed by including a blend resin of a styrene copolymer and a polyester elastomer, an epoxy resin and a phosphor-based flame retardant agent, and the present invention was completed.

Particularly, in an embodiment of the present invention, a flame retardant resin composition including:

(A) 100 parts by weight of a blend resin composition including a styrene copolymer and a polyester elastomer;

(B) 1 to 30 parts by weight of an epoxy resin; and (C) 1 to 30 parts by weight of a phosphor-based flame retardant agent, is provided.

The flame retardant resin composition of the present invention is a non-halogen flame retardant resin composition and may be used for the preparation of a coating material of a wire or a cable.

Hereinafter, each component composing the non-halogen flame retardant resin composition will be described in detail.

(A) Blend Resin Composition Including Styrene Copolymer and Polyester Elastomer

In the flame retardant resin composition of the present invention, the blend resin composition is a blend resin composition obtained by mixing at least one styrene copolymer and at least one polyester elastomer in a mixing ratio of 20 to 70 parts by weight:30 to 80 parts by weight, and particularly, 20 to 60 parts by weight:40 to 80 parts by weight.

In the case that the amount of the styrene copolymer is less than 20 parts by weight, flowability, rigidity, and heat resistance may be deteriorated, and in the case that the amount of the styrene copolymer exceeds 70 parts by weight, impact strength may be markedly deteriorated.

(A-1) Styrene Copolymer

As typical examples of the styrene copolymer, a single material or a mixture of at least two selected from the group consisting of i) an alkyl acrylate-styrene-acrylonitrile graft copolymer (hereinafter, 'ASA copolymer') and ii) an acrylonitrile-butadiene-styrene copolymer (hereinafter, 'ABS copolymer') may be used.

In this case, the ASA copolymer may be prepared by the graft copolymerization of 30 to 50 wt % of an alkyl acrylate monomer, 10 to 40 wt % of a vinyl cyan monomer and 10 to 40 wt % of a vinyl aromatic monomer.

In the case that the amount of the alkyl acrylate monomer is less than 30 wt %, impact strength may be markedly deteriorated, and in the case that the amount exceeds 50 wt %, heat resistance, flowability and rigidity may be deteriorated. In addition, in the case that the amount of the vinyl cyan monomer is less than 10 wt %, chemical resistance and rigidity may be deteriorated and in the case that the amount exceeds 40 wt %, elasticity and flexibility may be deteriorated. Further, in the case that the amount of the vinyl aromatic monomer is less than 10 wt %, flowability, rigidity and heat resistance may be deteriorated and in the case that the amount exceeds 40 wt %, impact strength may be markedly deteriorated.

In addition, the ABS copolymer may be prepared by the graft copolymerization of 50 to 70 wt % of a butadiene monomer, 5 to 40 wt % of a vinyl cyan monomer and 20 to 65 wt % of a vinyl aromatic monomer.

In the case that the amount of the butadiene monomer is less than 50 wt %, impact strength may be markedly deteriorated and in the case that the amount exceeds 70 wt %, heat resistance, flowability and rigidity may be deteriorated. In the case that the amount of the vinyl cyan monomer is less than 5 wt %, chemical resistance and rigidity may be deteriorated and in the case that the amount exceeds 40 wt %, elasticity and flexibility may be deteriorated. In addition, in the case that the amount of the vinyl aromatic monomer is less than 20 wt %, flowability, rigidity and heat resistance may be deteriorated and in the case that the amount exceeds 65 wt %, impact strength may be markedly deteriorated.

The alkyl acrylate monomer and the butadiene monomer may preferably have a number average diameter of 0.1 to 0.5 micrometers. When using a flame retardant resin composition including the alkyl acrylate monomer having a particle diameter in the above range as a coating material of a wire or a cable according to the present invention, appearing physical properties such as gloss and coloring and mechanical strength may be secured.

In addition, the alkyl acrylate monomer composing the ASA copolymer may include an alkyl group having 2 to 8 carbon atoms, and may preferably include an alkyl group having 4 to 8 carbon atoms.

In addition, the vinyl cyan monomer composing the ASA copolymer and the ABS copolymer may particularly include a single material or a mixture of at least two selected from the group consisting of acrylonitrile, methacrylonitrile and ethacrylonitrile.

In addition, the vinyl aromatic monomer constituting the ASA copolymer and the ABS copolymer may particularly include a single material or a mixture of at least two selected from the group consisting of styrene, alpha methyl styrene, para methyl styrene and vinyl toluene.

In addition, the styrene copolymer may be prepared via an emulsion graft polymerization reaction to stably prepare particles having constant size and to improve grafting efficiency.

During performing the emulsion graft polymerization reaction, commonly used materials during preparing a styrene copolymer such as an emulsifier, an initiator, a grafting agent, a cross-linking agent, a molecular weight regulator, an electrolyte, etc. may be appropriately selected and used as occasion demands.

In addition, with respect to the styrene copolymer prepared by the emulsion graft polymerization reaction, an agglomeration process and a drying process may be additionally performed as subsequent processes to recover a dried powder state thereof for the use.

The weight average molecular weight of the ASA copolymer and the ABS copolymer in the styrene copolymer may preferably be at least $5 \times 10^4$ in consideration of mechanical strength, heat resistance, etc. and at most $50 \times 10^4$ in consideration of productivity. Particularly, the weight average molecular weight may preferably be from $7 \times 10^4$ to $30 \times 10^4$, and may more preferably be $8 \times 10^4$.

(A-2) Polyester Elastomer

The polyester elastomer is a thermoplastic polymer obtained by the random block copolymerization of (i) a crystalline hard segment and (ii) a soft segment.

(i) The crystalline hard segment and (ii) the soft segment may be mixed in an amount ratio of 20 to 60 parts by weight:80 to 40 parts by weight. In the case that the amount of the crystalline hard segment is less than 20 parts by weight, the resin is too soft and is hard to use and in the case that the amount exceeds 60 parts by weight, the resin is too hard and is inappropriate as a material for a soft wire.

Particularly, (i) the crystalline hard segment includes a polyester compound including an ester group formed by the condensation of an aromatic dicarboxylic acid and a derivative thereof with an aliphatic diol, or an ester group formed by the condensation of an aromatic dicarboxylic acid derivative with an aliphatic diol, as a main component.

The aromatic dicarboxylic acid may include terephthalic acid (TPA), isophthalic acid (IPA), 2,6-naphthalene dicarboxylic acid (2,6-NDCA), 1,5-naphthalene dicarboxylic acid (1,5-NDCA) or 1,4-cyclohexane dicarboxylic acid (1,4-CHDA). The aromatic dicarboxylic acid derivative may include an aromatic dicarboxylate compound of which hydrogen in —COOH is substituted with a methyl group, for example, dimethyl terephthalate (DMT), dimethyl isophthalate (DMI), 2,6-dimethyl naphthalene dicarboxylate (2,6-NDC), dimethyl 1,4-cyclohexanedicarboxylate (2,6-NDC), dimethyl 1,4-cyclohexanedicarboxylate (DMCD) or a mixture thereof. Preferably, the aromatic dicarboxylic acid derivative may include DMT.

In addition, the aromatic dicarboxylic acid and the derivative thereof may be used in an amount range from 10 to 55 wt %, and preferably from 15 to 50 wt % based on the total amount of the polyester elastomer. In the case that the amount of the aromatic dicarboxylic acid and the derivative thereof is less than 15 wt % or exceeds 50 wt %, the balance of a total condensation reaction may not be right, and the condensation copolymerization reaction may not be carried out well.

In addition, as the aliphatic diol, an aliphatic diol compound having a molecular weight less than or equal to 300, for example, a single material or a mixture of at least two selected from the group consisting of ethylene glycol, propylene glycol, 1,2-propanediol, 1,3-propanediol, 1,4-butanediol, 1,5-pentanediol, 1,6-hexanediol and 1,4-cyclohexanedimethanol may be used. Preferably, 1,4-butanediol may be used.

The aliphatic diol may be used in an amount ratio from 10 to 30 wt %, and preferably from 15 to 25 wt % of the total amount of the polyester elastomer. In the case that the amount of the aliphatic diol compound is less than 15 wt % or exceeds 25 wt %, the balance of the total condensation reaction may not be right, and the condensation copolymerization reaction may not be carried out well.

In addition, (ii) the soft segment includes a polyalkylene oxide compound including an ether group formed by an addition reaction, as a main component.

In addition, the polyalkylene oxide compound including the ether group may include an aliphatic polyether compound, and the polyether compound may particularly include polyoxyethylene glycol, polyoxypropylene glycol, polyoxytetramethylene glycol (PTMEG), polyoxyhexamethylene glycol, a copolymer of ethylene oxide and propylene oxide, an addition polymer of ethylene oxide and polypropylene oxide glycol, a copolymer of ethylene oxide and tetrahydrofuran. Among the compounds, PTMEG having a number average molecular weight in a range of 600 to 3,000 or a polypropyleneoxide glycol having a molecular weight in a range of 2,000 to 3,000, of which terminal is capped with ethylene oxide may preferably be used.

The hardness of the polyester elastomer (shore D) is determined by the amount of the polyalkylene oxide included as a main component of the soft segment. That is, the polyalkylene oxide may be used in an amount ratio from about 40 to 80 wt %, and preferably, from 45 to 80 wt % based on the total amount of the polyester elastomer. In the case that the amount of the polyalkyleneoxide is less than 40 wt %, the hardness of a finally prepared flame retardant resin composition may be high, and flexibility may be deteriorated when forming a coating material of a cable, a wire, etc. In the case that the amount exceeds 80 wt %, the condensation polymerization reaction may not be carried out well due to the defects concerning compatibility of the hard segment and the aliphatic polyether.

Meanwhile, the polyester elastomer may be prepared by a first melt condensation polymerization or may be prepared as a block copolymer having a high polymerization degree and lower melting index by a second solid phase polymerization.

In particular, the polyester elastomer is prepared as follows. Transesterification reaction is carried out with starting materials of (i) an aromatic dicarboxylic acid and an aliphatic diol, as main components of the crystalline hard segment and (ii) polyalkyleneoxide as a main component of the soft segment in the presence of a titanium butoxide (TBT) catalyst at a temperature range of 140° C. to 215° C. for 120 minutes to produce a bis(4-hydroxybutyl)terephthalate (BHBT) oligomer. Then, the TBT catalyst is inserted in the oligomer again and polymerization condensation reaction is carried out in the temperature conditions of about 215 to 245° C. for about 120 minutes. In this case, the polymerization condensation reaction is carried out while decreasing pressure from 760 torr to 0.3 torr step by step. The polymerization condensation reaction is carried out by melt polymerization until a melt flow index (MFI) becomes a target value on the basis of ASTM D-1238. After completing the reaction, the reactant is discharged from a reactor by means of a nitrogen pressure, and a pellet is formed through the pelletizing of strand. The melting point of a polyester elastomer finally obtained via the above-described process is from 130° C. to 220° C., and preferably, from 140 to 210° C., the MI thereof is 5 to 30 g/min with the load of 2.16 kg at 230° C.

(B) Epoxy Resin

In addition, the epoxy resin used in the flame retardant resin composition of the present invention may include a polyfunctional epoxy resin compound represented by the following Formula for a four-functional epoxy resin compound represented by the following Formula 2. Preferably, the epoxy resin may be a four-functional epoxy resin compound represented by the following Formula 2.

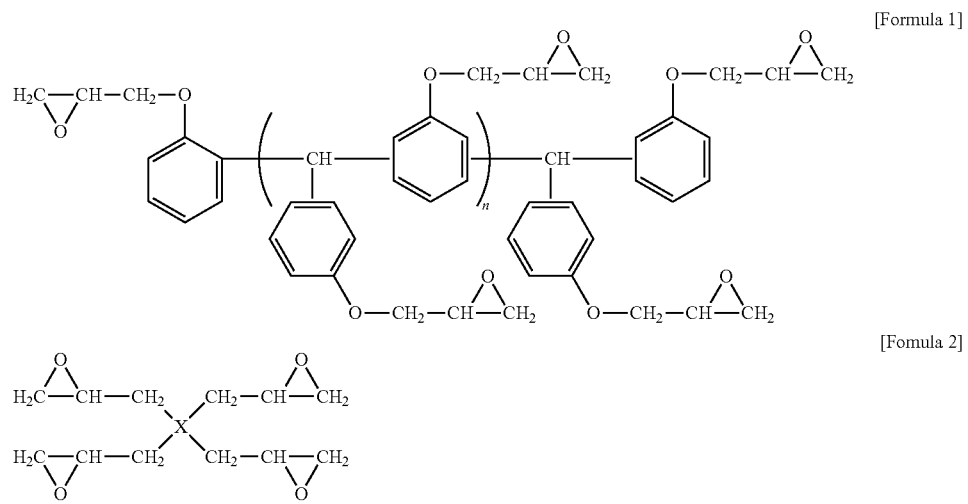

[Formula 1]

[Fomula 2]

In the above Formula 1 and Formula 2, X is a linear chain or branched chain alkyl group having 1 to 30 carbon atoms, a linear chain or branched chain aryl group having 1 to 30 carbon atoms, a linear chain or branched chain alkyl group having 1 to 30 carbon atoms and including an oxygen atom or a nitrogen atom, or a linear chain or a branched chain aryl group having 1 to 30 carbon atoms and including an oxygen atom or a nitrogen atom, and n is a natural number from 1 to 100.

In this case, the four-functional epoxy resin compound represented by the above Formula 2 may be represented by the following Formula 2a.

[Formula 2a]

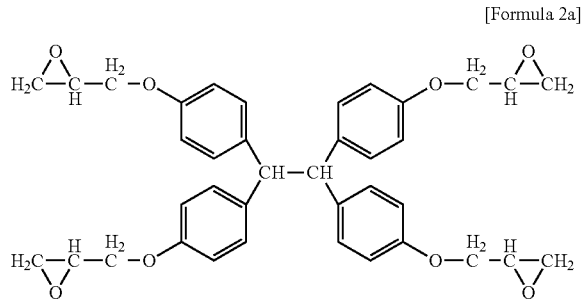 [SMILES: c1cc(C(c2ccc(OCC3CO3)cc2)C(c2ccc(OCC3CO3)cc2)c2ccc(OCC3CO3)cc2)ccc1OCC1CO1]

The epoxy resin includes the polyfunctional epoxy resin compound or the four-functional epoxy resin compound alone, or may include both of them at the same time.

The epoxy resin may preferably be included in an amount ratio of 1 to 30 parts by weight based on 100 parts by weight of the blend resin composition of the styrene copolymer and the polyester elastomer. In the above-described range, the flame retardant resin composition may form char and may exhibit good flame retardant performance without using an excessive amount of the phosphor-based flame retardant agent.

(C) Phosphor-Based Flame Retardant Agent

In addition, the phosphor-based flame retardant agent used in the flame retardant resin composition of the present invention may include a single material or a mixture of at least two selected from the group consisting of (a) a phosphate-based compound, (b) a diphosphate-based compound, (c) a polyphosphate-based compound having at least three phosphate groups, (d) a phosphonate-based compound, (e) a phosphinate-based compound and (f) a metal compound of diethylphosphinic acid.

Among the above compounds, typical examples of (a) the phosphate-based compound may include a single material or a mixture of at least two selected from the group consisting of triphenyl phosphate, tricresyl phosphate, tri(2,6-dimethylphenyl) phosphate and tri(2,4,6-trimethylphenyl) phosphate.

In addition, typical examples of (b) the diphosphate-based compound may include a single material or a mixture of at least two selected from the group consisting of tetraphenyl resorcinol diphosphate, tetracresyl resorcinol diphosphate, tetra(2,6-dimethylphenyl) resorcinol diphosphate and tetraphenyl bisphenol A diphosphate.

In the flame retardant resin composition of the present invention, the phosphor-based flame retardant agent may preferably be included in an amount ratio from 1 to 30 parts by weight based on 100 parts by weight of the blend resin composition of the styrene copolymer and the polyester elastomer. With the phosphor-based flame retardant agent in the above range, good flowability and appearance of the thermoplastic resin composition of the present invention may be secured without deteriorating mechanical strength and thermal stability.

(D) Other Additives

In addition, the flame retardant resin composition of the present invention may further include a single material or a mixture of at least two selected from the group consisting of a char former, a non-halogen flame retardant compound, an impact reinforcing agent, a lubricant, a thermal stabilizer, a dripping preventing agent, an antioxidant, a light stabilizer, an ultraviolet blocking agent, a pigment and an inorganic filler, as (D) other additives.

In this case, the other additives may be included in an amount ratio of 0.1 to 60 parts by weight, particularly, 0.1 to 50 parts by weight, and more particularly, 0.5 to 40 parts by weight based on 100 parts by weight of the blend resin composition of the styrene copolymer and the polyester elastomer.

In addition, a method of preparing a flame retardant resin composition including:

inserting (A) a blend resin composition of a styrene copolymer and a polyester elastomer, (B) an epoxy resin and (C) a phosphor-based flame retardant agent in an extruder; and, melt kneading and extruding at a barrel temperature of 180° C. to 250° C., is provided.

In this case, the extruder is not specifically limited; however, a biaxial extruder, etc. may be used.

MODE FOR CARRYING OUT THE INVENTION

Hereinafter, the present invention will be explained in more detail referring to examples and comparative examples, however the examples are for illustration of the present invention, and are not for limiting the scope of the present invention.

Examples

Flame retardant resin compositions of the present invention were prepared by homogeneously mixing (A) a blend resin composition of a styrene copolymer and a polyester elastomer, (B) an epoxy resin and (C) a phosphor-based flame retardant agent using a henschel mixer with the component ratios shown in the following Table 1, inserting the mixture thus obtained in a biaxial extruder, and melt kneading and extruding thereof at a barrel temperature of 180° C. to 250° C.

In this case, as (A-1) the styrene copolymer, an ASA copolymer prepared by using a butyl acrylate rubber latex having a number average particle diameter of 0.3 μm (50 wt % of a butyl acrylate rubber, 35 wt % of styrene and 15 wt % of acrylonitrile, LG Chem. Ltd.), or an ABS copolymer prepared by using a butadiene rubber latex having a number average particle diameter of 0.3 μm (60 wt % of a butadiene rubber, 10 wt % of styrene and 30 wt % of acrylonitrile, LG Chem. Ltd.) was used.

In addition, as (A-2) the polyester elastomer, Keyflex BT 1140D (LG Chem. LTD.) with hardness of 40D or Keyflex BT 1172D (LG Chem. LTD.) with hardness of 70D, composed of terephthalate as an aromatic dicarboxylic acid, 1,4-butanediol as an aliphatic diol and polyoxytetramethylene glycol as an aliphatic polyether compound, was used.

In addition, as (B) the epoxy resin, a polyfunctional epoxy resin compound having the above Formula 1 (KDMN-1065, Kukdo Chemical Co., Ltd.) or a four-functional epoxy resin compound having the above Formula 2a (KDT-4400, Kukdo Chemical Co., Ltd.), was used.

In addition, as (C) the phosphor-based flame retardant agent, an organic phosphor-based ester flame retardant agent, PX-200 (Daihachi Co.) was used.

Comparative Examples

Resin compositions were prepared by performing the same procedure described in the Example except for using (A) the blend resin composition of the styrene copolymer and the polyester elastomer, (B) the epoxy resin and (C) the phosphor-based flame retardant agent in component mixing ratios shown in the following Table 1.

Experimental Examples

The flame retardant resin compositions prepared in Examples 1 to 4 and Comparative Examples 1 to 3 were injection molded into a pellet shape, and dried using a hot air drier at 80° C. for 2 to 3 hours to remove moisture. Then, a specimen was manufactured using an injection molder. Using the specimen, hardness, retardancy grade and dripping phenomenon were evaluated, and the results are illustrated in the following Table 1.

In this case, the hardness was measured as shore A type based on ASTM D 2240. In addition, the retardancy grade was measured using a specimen having a size of 1.6 mm thickness, 12.7 mm width and 127 mm length based on the VW-1 evaluation of underwriter's laboratory (UL) 1581 section 1080 standard. In addition, total burning time and the dripping phenomenon were observed by repeating contacting methane flame having 500 W calories under the specimen for 15 seconds and removing thereof for 15 seconds five times.

On the contrary, in the resin compositions not including the styrene copolymer according to Comparative Examples 1 and 3, the melting viscosity of the polyester elastomer was too low, and dripping was generated. Thus, retardancy grade standard did not get through. In addition, in the resin composition not including the polyester elastomer according to Comparative Example 2, the styrene resin was carbonized during performing an extrusion process, and the measuring of the hardness and the flame retardancy grade could not be performed. In addition, since the resin composition not including the epoxy resin according to Comparative Example 4 included the styrene copolymer, the dripping was prevented for a substantial amount of time. However, the flame did not go out because of the absence of the epoxy resin for forming char. After all, the epoxy resin could not endure the high temperature, and dripping was generated and the retardancy grade was not satisfied.

According to the result, in the flame retardant resin compositions according to Examples 1 to 4 and Comparative Examples 1 to 4, it would be secured that flame retardant effect could not be obtained if any one of a styrene copolymer and a polyester elastomer, and an epoxy resin is excluded.

The invention claimed is:
1. A flame retardant resin composition, comprising:
(A) 100 parts by weight of a blend resin composition including a styrene copolymer and a polyester elastomer in a ratio of 20 to 60 parts by weight:40 to 80 parts by weight, respectively;
(B) 1 to 30 parts by weight of an epoxy resin; and
(C) 1 to 30 parts by weight of a phosphor-based flame retardant agent,
wherein the epoxy resin comprises a four-functional resin compound represented by the following Formula 2:

TABLE 1

|  |  | Examples | | | | Comparative Examples | | | |
| --- | --- | --- | --- | --- | --- | --- | --- | --- | --- |
|  |  | 1 | 2 | 3 | 4 | 1 | 2 | 3 | 4 |
| Styrene | ASA | 40 | 40 | — | 25 | — | 100 | — | 40 |
| copolymer | ABS | — | — | 40 | 25 | — | — | — | 70 |
| Polyester elastomer | Keyflex 1140D | 60 | — | — | — | — | — | — | — |
|  | Keyflex 1172D | — | 60 | 60 | 50 | 100 | — | 100 | 60 |
| Epoxy resin | Polyfunctional | 15 | 15 | — | 15 | 15 | 15 | — | — |
|  | Four-functional | — | — | 10 | — | — | — | 15 | — |
| Phosphor-based flame retardant agent | PX-200 | 20 | 20 | 20 | 20 | 20 | 20 | 20 | 20 |
| Hardness (Shore A) |  | 75 | 80 | 70 | 75 | 90 | X | 80 | 85 |
| Retardancy grade (VW-1) |  | Pass | Pass | Pass | Pass | Fail | X | Fail | Fail |
| Dripping |  | X | X | X | X | ○ | X | ○ | ○ |

From Table 1, the specimens obtained using the flame retardant resin compositions of Examples 1 to 4 of the present invention included the epoxy resin as an essential component, and char was formed and high flame retardancy was attained. Since main components had low hardness and flexibility, it would be secured that a flexible flame retardant resin composition having low hardness and flexibility was obtained. Particularly, a specimen manufactured using the flame retardant resin composition including the four-functional epoxy group of Example 3 exhibited good flame retardant properties with relatively small amount of the epoxy resin. The result means that the four-functional epoxy resin may have better properties in forming char than other epoxy resins. In addition, since the four-functional epoxy resin had relatively smaller molecular weight than other epoxy resins, lower hardness properties were exhibited.

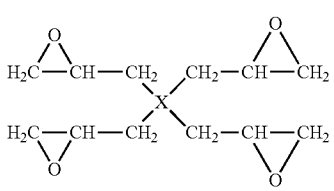

[Formula 2]

in the above Formula 2, X is a linear chain or branched chain alkyl group having 1 to 30 carbon atoms, a linear chain or branched chain aryl group having 1 to 30 carbon atoms, a linear chain or branched chain alkyl group having 1 to 30 carbon atoms and including an oxygen atom or a nitrogen atom, or a linear chain or a branched chain aryl group having 1 to 30 carbon atoms and including an oxygen atom or a nitrogen atom, wherein the styrene copolymer is an alkyl acrylate-styrene-acrylonitrile-based graft copolymer (ASA copolymer), and wherein the polyester elastomer is a thermoplastic block copolymer with (i) 40 to 80 parts by weight of a crystalline hard segment and (ii) 60 to 20 parts by weight of a soft segment.

2. The flame retardant resin composition of claim 1, wherein the flame retardant resin composition is a non-halogen flame retardant resin composition.

3. The flame retardant resin composition of claim 1, wherein the flame retardant resin composition is used for coating a wire or a cable.

4. The flame retardant resin composition of claim 1, wherein the ASA copolymer includes 30 to 50 wt % of an alkyl acrylate monomer, 10 to 40 wt % of a vinyl cyan monomer and 10 to 40 wt % of a vinyl aromatic monomer.

5. The flame retardant resin composition of claim 4, wherein the alkyl acrylate monomer comprises an alkyl group having 2 to 8 carbon atoms.

6. The flame retardant resin composition of claim 1, wherein the ASA copolymer has a weight average molecular weight of $5 \times 10^4$ to $50 \times 10^4$.

7. The flame retardant resin composition of claim 6, wherein the ASA copolymer has a weight average molecular weight of $7 \times 10^4$ to $30 \times 10^4$.

8. The flame retardant resin composition of claim 1, wherein (i) the crystalline hard segment comprises a polyester compound comprising an ester group formed by condensation reaction of an aromatic dicarboxylic acid and a derivative thereof with an aliphatic diol, or an ester group formed by condensation reaction of an aromatic dicarboxylic acid derivative with an aliphatic diol, as a main component.

9. The flame retardant resin composition of claim 8, wherein the aromatic dicarboxylic acid comprises at least one selected from the group consisting of terephthalic acid (TPA), isophthalic acid (IPA), 2,6-naphthalene dicarboxylic acid (2,6-NDCA), 1,5-naphthalene dicarboxylic acid (1,5-NDCA) and 1,4-cyclohexane dicarboxylic acid (1,4-CHDA), and the aromatic dicarboxylic acid derivative comprises at least one selected from the group consisting of dimethyl terephthalate (DMT), dimethyl isophthalate (DMI), 2,6-dimethyl naphthalene dicarboxylate (2,6-NDC), dimethyl 1,4-cyclohexanedicarboxylate (DMCD) and a mixture thereof.

10. The flame retardant resin composition of claim 8, wherein the aromatic dicarboxylic acid and a derivative thereof are comprised in an amount ratio from 10 to 55 wt % based on a total amount of the polyester elastomer.

11. The flame retardant resin composition of claim 8, wherein the aliphatic diol is an aliphatic diol compound having a molecular weight less than or equal to 300.

12. The flame retardant resin composition of claim 8, wherein the aliphatic diol comprises at least one selected from the group consisting of ethylene glycol, propylene glycol, 1,2-propanediol, 1,3-propanediol, 1,4-butanediol, 1,5-pentanediol, 1,6-hexanediol, 1,4-cyclohexanedimethanol and a mixture thereof.

13. The flame retardant resin composition of claim 8, wherein the aliphatic diol is comprised in an amount ratio of 10 to 30 wt % based on a total amount of the polyester elastomer.

14. The flame retardant resin composition of claim 1, wherein (ii) the soft segment comprises a polyalkylene oxide compound having an ether group formed by addition reaction, as a main component.

15. The flame retardant resin composition of claim 14, wherein the polyalkylene oxide compound having an ether group comprises at least one selected from the group consisting of polyoxyethylene glycol, polyoxypropylene glycol, polyoxytetramethylene glycol (PTMEG), polyoxyhexamethylene glycol, a copolymer of ethylene oxide and propylene oxide, an addition polymer of ethylene oxide and polypropylene oxide glycol, and a copolymer of ethylene oxide and tetrahydrofuran.

16. The flame retardant resin composition of claim 1, wherein (B) the epoxy resin further comprises a polyfunctional epoxy resin compound represented by the following Formula 1:

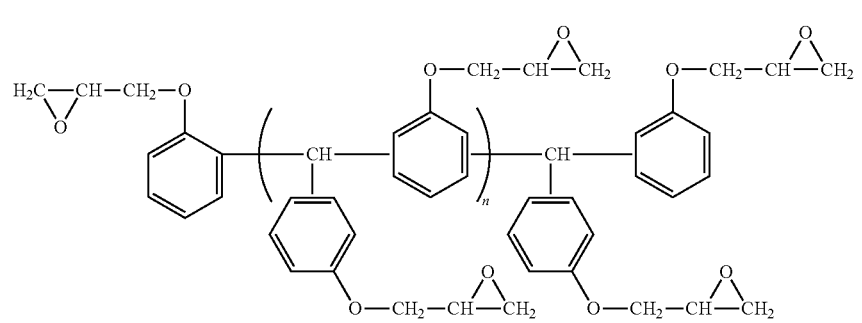

[Formula 1]

in the above Formula 1 n is a natural number from 1 to 100.

17. The flame retardant resin composition of claim 1, wherein the four-functional epoxy resin compound represented by Formula 2 is represented by the following Formula 2a:

[Formula 2a]

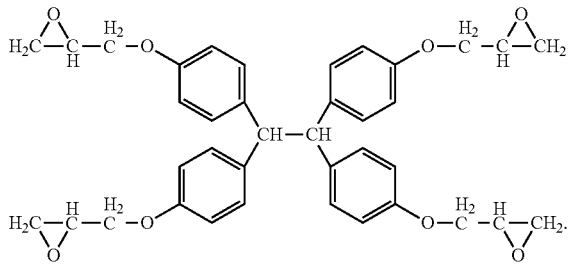

18. The flame retardant resin composition of claim 1, wherein (C) the phosphor-based flame retardant agent comprises at least one selected from the group consisting of (a) a phosphate-based compound, (b) a diphosphate-based compound, (c) a polyphosphate-based compound having at least three phosphate groups, (d) a phosphonate-based compound, (e) a phosphinate-based compound, (f) a metal diethylphosphinate compound and a mixture thereof.

19. The flame retardant resin composition of claim 18, wherein (a) the phosphate-based compound comprises at least one selected from the group consisting of triphenyl phosphate, tricresyl phosphate, tri(2,6-dimethylphenyl) phosphate, tri(2,4,6-trimethylphenyl) phosphate and a mixture thereof, and (b) the diphosphate-based compound comprises at least one selected from the group consisting of tetraphenyl resorcinol diphosphate, tetracresyl resorcinol diphosphate, tetra(2,6-dimethylphenyl) resorcinol diphosphate, tetraphenyl bisphenol A diphosphate and a mixture thereof.

* * * * *